United States Patent [19]

Lapidus

[11] Patent Number: 5,197,208
[45] Date of Patent: Mar. 30, 1993

[54] ODOR-ADSORBENT ACTIVATED CHARCOAL

[75] Inventor: Herbert Lapidus, Ridgefield, Conn.

[73] Assignee: Combe Incorporated, White Plains, N.Y.

[21] Appl. No.: 739,252

[22] Filed: Aug. 1, 1991

Related U.S. Application Data

[63] Continuation-in-part of Ser. No. 649,651, Feb. 6, 1991, abandoned.

[51] Int. Cl.$^5$ .............................................. A43B 13/38
[52] U.S. Cl. .......................................... 36/43; 502/417
[58] Field of Search ....................... 36/44, 43; 502/417, 502/424

[56] References Cited

U.S. PATENT DOCUMENTS

| | | | |
|---|---|---|---|
| Re. 29,501 | 12/1977 | Lapidus | 36/44 |
| 1,519,470 | 12/1924 | Wilson et al. | 502/417 |
| 3,842,519 | 10/1974 | Lapidus | 36/44 |
| 4,677,096 | 6/1987 | van der Smissen | 502/417 |
| 5,063,196 | 11/1991 | Doughty et al. | 502/417 |

OTHER PUBLICATIONS

Translation of Japanese Pat. No. 61-217169, Kanda et al. Date: unknown.
Translation of Japanese Pat. No. 61-272054, Kanda et al. Date: unknown.
Kanda et al., "Elucidating Body Malodour to Develop a Novel Body Odour Quencher", Date: unknown.

*Primary Examiner*—Jimmy G. Foster
*Assistant Examiner*—Ted Kavanaugh
*Attorney, Agent, or Firm*—Roland T. Bryan

[57] ABSTRACT

An improved foot odor adsorbent is described having about 2.5% by weight of zinc oxide impregnated onto finely divided activated charcoal. Data is presented comparing the odor-reducing ability of the improved charcoal to conventional activated charcoal, zinc oxide powder, and standard latex foam that has been vulcanized with zinc oxide. Data is also presented showing the comparative odor-reducing ability of latex foam which incorporates various amounts of the improved activated charcoal and standard foam incorporating conventional activated charcoal.

5 Claims, No Drawings

ODOR-ADSORBENT ACTIVATED CHARCOAL

This is a continuation in part of application Ser. No. 07/649,561, filed Feb. 6, 1991 now abandoned.

BACKGROUND OF THE INVENTION

Activated charcoal has long been known as a deodorizing agent. My prior invention shown in U.S. Reissue Pat. No. 29,504, illustrates its use in a deodorizing sheet comprising open-cell latex foam having finely ground activated charcoal homogeneously dispersed throughout the foam material. This product has been widely and effectively used in insoles to suppress disagreeable foot odor.

It has been reported in Japanese patent specifications, Nos. 61-217169 (1986) and 61-272054 (1986), that zinc oxide powder on minute nylon spheres has a strong action to decrease odor arising from the foot. Further, it has been found by an inventor of said specifications that isovaleric acid is a constant component of foot odor and that measurements of the effectiveness of zinc oxide to reduce the isovaleric acid can be used to determine the odor-reducing effectiveness of any tested zinc oxide.

Latex foam has an ingredient, zinc oxide, as shown in Example 1 of my Reissue patent, to vulcanize the latex. I have no evidence that the presence of zinc oxide in the latex reduces odor. The insoles made according to the Reissue patent are effective to reduce foot odor; however, there is a need for greater odor reduction.

SUMMARY OF THE INVENTION

My invention is to an improved activated charcoal where the activated charcoal is finely divided and has about 2.5% by weight of zinc oxide impregnated thereon. Such charcoal greatly improves the reduction of foot odor.

Further, such improved charcoal, when homogeneously dispersed throughout the walls of open-cell foam, provides an improved deodorizer which can be formed into the basic shape of a foot for use as a shoe insert.

DESCRIPTION OF PREFERRED EMBODIMENTS

So that my invention may be fully understood, I describe hereinafter specific examples of the invention and how they may be used to advantage to reduce body odor, and specifically foot odor.

Embodiment No. 1—Zinc Nitrate

The improved activated charcoal may be made by taking washed high grade activated charcoal, such as LA100-325X, obtained from Nucon International, Inc., of Columbus, Ohio, and placing it in a solution of zinc nitrate hexahydrate in water, mixing it, and then drying the charcoal at 150° C. to leave zinc oxide impregnated on each particle of charcoal. A mass balance is used to determine the amounts of the ingredients necessary to impregnate a predetermined amount of zinc oxide on the finely divided charcoal.

Embodiment No. 2—Zincate

The preferred embodiment of the invention is made by dissolving sodium zincate in water and then mixing in the washed high grade activated charcoal, LA100-325X, and drying same at 150° C. to leave zinc oxide impregnated on each particle of activated charcoal.

Nucon specification LA 100-325X is an activated charcoal powder having a particle size distribution of 1.0% maximum on 100 mesh (U. S. Sives), 10.0% maximum on 100×325 mesh, and 90% through 325 mesh. Such charcoal has a surface area of about 1300 sq. meters/gram and contains about 0.04% by weight of zinc oxide resulting from its processing. The zinc oxide is impregnated on each particle of activated charcoal as a result of the drying process.

For odor reduction comparison purposes, samples of Embodiment No. 1—Zinc Nitrate were prepared with varying percentages of zinc oxide impregnated on tne charcoal particles. Thus, samples of the charcoal were made with 0.25% ZnO, 0.35% ZnO, 2.5% ZnO, 1.0% ZnO, 5.0% ZnO, 15.0% ZnO, and 20.0% ZnO.

Short chain fatty acids such as isovaleric acid have been recognized in the art as a constant part of foot odor and thus can be used as the necessary marker for foot odor reduction. I have used isovaleric acid at a concentration of 100 ppm as a solution into which the aforesaid prepared samples were placed and then I determined the amount of dose of the adsorbent samples that are required to reduce the solution to 50 ppm of acid in accordance with the guidelines of ASTM D-3860, "Adsorption Capacity of Carbon by Isotherm Technique." I also prepared samples of zinc oxide powder alone (KADOX-920, Zinc Corp. of America), LA100-325X charcoal, and standard latex foam that had been vulcanized with 4.5 pph ZnO. All these samples were then individually tested to determine the required dosage to reduce th 100 ppm solution of isovaleric acid to 50 ppm. The results of those tests are as follows:

TABLE I

| Adsorbent | Dose (g/l) |
| --- | --- |
| Charcoal + 0.25% ZnO (Nitrate) | 5.5 |
| Charcoal + 0.35% ZnO (Nitrate) | 6.1 |
| Charcoal + 1.00% ZnO (Nitrate) | 4.3 |
| Charcoal + 2.50% ZnO (Nitrate) | 2.4 |
| Charcoal + 5.00% ZnO (Nitrate) | 10.2 |
| Charcoal + 15.00% ZnO (Nitrate) | 10.8 |
| Charcoal + 20.00% ZnO (Nitrate) | 91.4 |
| Charcoal alone | 4.5 |
| Charcoal washed | 7.8 |
| Standard latex foam with 4.5 pph ZnO | 6.7 |
| ZnO powder | 512.0 |

In addition to the samples of Table I, I prepared a second set of samples of Embodiment No. 1—Zinc Nitrate and Embodiment No. 2—Zincate and tested them by the procedure described above with the results shown below in Table II.

TABLE II

| Adsorbent | Dose (g/l) |
| --- | --- |
| LA100-325X + 2.5% ZnO (Zincate) | 1.9 |
| LA100-325X + 2.5% ZnO (Nitrate) | 2.4 |
| LA100-325X + 1.0% ZnO (Nitrate) | 4.2 |
| LA100-325X | 4.6 |
| LA100-325X + 0.25% ZnO (Nitrate) | 5.7 |
| Standard latex foam with 4.5 pph ZnO | 6.7 |
| Washed LA100-325X | 7.8 |
| LA100-325X + 5.0% ZnO (Nitrate) | 10.5 |
| LA100-325X + 10.0% ZnO (Nitrate) | 10.4 |
| LA100-325X + 15.0% ZnO (Nitrate) | 10.8 |
| Latex foam with .44 pph ZnO + 22.5 pph Carbon | 24.1 |
| Standard activated charcoal | 71.2 |
| LA-100-325X + 20.0% ZnO (Nitrate) | 91.4 |
| KADOX 920 - Zinc Oxide | 614.5 |

As seen in Table II, the zincate impregnated 2.5% ZnO+LA100-325X is superior to Embodiment No.

1—Zinc Nitrate and to the other adsorbents for isovaleric acid removal from water.

The results of Table I show clearly that the charcoal with about 2.5% ZnO, Embodiment No. 1, is superior to activated charcoal with lesser and greater amounts of ZnO impregnated thereon. Further, this charcoal with 2.5% zinc has the maximum adsorbent ability of any material in those tests. Its adsorbent ability is twice as good as the charcoal alone and three times as good as the washed charcoal. (Washed charcoal is largely free of the ZnO that normally is present in processed activated charcoal.)

Further, the improved charcoal of Embodiment No. 1 has more than a twofold ability to remove isovaleric acid than the standard latex foam vulcanized with zinc oxide. Zinc oxide alone, as tested by my method, is an extremely poor adsorbent.

Looking at the progression of the data of Table I, it appears that the range of percentages of zinc oxide impregnated on charcoal is very narrow and the improvement range would be in the order of about 2% to 3% by weight.

It is to be particularly noted from Table II that Embodiment No. 2—Zincate at 2.5% by weight zinc oxide impregnated on the charcoal particles is a superior adsorber to Embodiment No. 1—Zinc Nitrate, with a nearly 20% improvement. Consequently, Embodiment No. 2—Zincate is almost a threefold improvement in adsorption capacity than the unwashed high grade activated charcoal LA100-325X.

As a further check on the odor-reducing ability of the improved charcoal and when such charcoal is in the latex foam, incorporated the improved charcoal of Embodiment No. 1—Zinc Nitrate having about 2.5% ZnO by weight into a standard latex foam mix made according to my Reissue Pat. No. 29,504. I then made samples of such foam with increasing amounts of 2.5% impregnated charcoal instead of the charcoal that is specified in the Reissue Patent. This was done by taking approximately 400 grams of standard latex foam with the zinc oxide vulcanized and adding varying numbers of grams of the improved charcoal with 2.5% ZnO impregnated thereon. After the various foam samples were made, a sample thereof was placed in 100 ml of water and agitated in a Waring blender. The foam sample was then filtered and dried in an 80° C. oven overnight. The dried foam was then screened to obtain 16×20 U. S. mesh particles and 4 grams of this foam was then packed into a gas chromatograph column having a ⅜ inch diameter. A gas stream of air and isovalteric acid was used to obtain a Trace as a standard procedure.

The relative peak heights obtained from the gas chromatograph are known to be dependent on the properties of the peaking in the column. Thus, an adsorbent which has a strong affinity for the adsorbate will have a shorter, broader peak than one which does not. Also, an adsorbent with a strong affinity for the adsorbate will have a longer retention time than adsorbents with weaker affinities.

The results of the tests for each of the samples are as follows:

TABLE III

| Foam Sample | Peak Height (cm) | Retention Time (min.) |
| --- | --- | --- |
| Standard Foam + 33 g | 9.0 | 8.0 |

TABLE III-continued

| Foam Sample | Peak Height (cm) | Retention Time (min.) |
| --- | --- | --- |
| LA100-325X with 2.5% ZnO Standard Foam + 16 g | 10.3 | 7.5 |
| LA100-325X with 2.5% ZnO Standard Foam + 8 g | 11.2 | 7.0 |
| LA100-325X with 2.5% ZnO Standard Foam + 33 g | 13.8 | 2.0 |
| LA100-325X charcoal | | |

The results of Table III show that the use of the invention in a standard latex foam (vulcanized with zinc oxide) has its adsorbent ability improved as more of the charcoal of the present invention is added. Accordingly, it depends upon the application for which a particular foam is to be used as to how much the charcoal of this invention is included. As a rule, the more charcoal one adds to the foam, the more dense it becomes so that for an insole application, the denser foam is desirable for an athletic shoe, whereas the less dense foam would be more desirable for a walking shoe.

I also made another gas adsorption test as described above to compare the gas adsorbing ability of Embodiment No. 1 and Embodiment No. 2.

TABLE IV

| Adsorbent | Relative Peak Height | Retention Time (min) |
| --- | --- | --- |
| LA100-325X + 2.5% ZnO (Zincate) | 1.0 | 44.5 |
| LA100-325X + 2.5% ZnO (Nitrate) | 1.3 | 28.8 |

Based on the results shown in the tables, the 2.5% ZnO+LA100-325X Embodiment No. 2—Zincate is the superior adsorbent for the removal of isovaleric acid from both liquid and gas phases.

It will be understood by those skilled in the art that the foregoing examples are for illustration purposes and that variations in the impregnation technique are possible, and that charcoal of greater particle size than described herein would have its adsorbing ability enhanced by the addition of about 2.5% zinc oxide impregnated thereon.

Although I have disclosed data for open-cell latex foam, the present invention is useful in other open-cell foams such as polyurethane or vinyl chloride foams.

I claim:

1. An improved body odor absorbing activated charcoal comprising finely divided particles of activated charcoal having a surface area for adsorption of about 1300 sq. meters/gram and critically having about 2.5% by weight of zinc oxide impregnated thereon.

2. In a deodorizing sheet material of open-cell foam having interstitial spaces therein allowing for the passage of air therethrough, the invention comprising the improved activated charcoal of claim 1 being homogeneously dispersed throughout the cell material of said foam.

3. A sheet material according to claim 2 in which said foam is made of open-cell latex foam material.

4. In an effective foot-deodorizing insole, said insole shaped to conform to the basic outline of a foot and being made of open-cell foam, the invention comprising the improved activated charcoal of claim 1 being homogeneously dispersed throughout the cell material of said foam.

5. An effective foot-deodorizing insole according to claim 4 in which said foam is made of open-cell latex foam material.

* * * * *

UNITED STATES PATENT AND TRADEMARK OFFICE
CERTIFICATE OF CORRECTION

PATENT NO. : 5,197,208
DATED : March 30, 1993
INVENTOR(S) : Herbert Lapidus

It is certified that error appears in the above—identified patent and that said Letters Patent is hereby corrected as shown below:

Column 3, line 34, after "foam" the word --I-- was omitted.
"foam" the word --I-- was omitted.

Column 4, line 46, "absorbing" should be --adsorbing--.
should be --adsorbing--.

Signed and Sealed this

Thirtieth Day of November, 1993

Attest:

BRUCE LEHMAN

Attesting Officer

Commissioner of Patents and Trademarks